(12) United States Patent
Yamaguchi et al.

(10) Patent No.: US 10,701,237 B2
(45) Date of Patent: Jun. 30, 2020

(54) INFORMATION PROCESSING APPARATUS AND DATA STORAGE PROGRAM

(71) Applicant: KONICA MINOLTA, INC., Chiyoda-ku, Tokyo (JP)

(72) Inventors: Takehisa Yamaguchi, Ikoma (JP); Yuji Okamoto, Amagasaki (JP); Hidetaka Iwai, Itami (JP); Nobuhiro Mishima, Osaka (JP); Atsushi Tamura, Amagasaki (JP); Katsuyuki Sugita, Osaka (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 16/430,680

(22) Filed: Jun. 4, 2019

(65) Prior Publication Data

US 2019/0394352 A1   Dec. 26, 2019

(30) Foreign Application Priority Data

Jun. 25, 2018   (JP) .................................. 2018-119554

(51) Int. Cl.
*H04N 1/32* (2006.01)
*H04N 1/44* (2006.01)
*G06F 3/12* (2006.01)

(52) U.S. Cl.
CPC ....... *H04N 1/32272* (2013.01); *G06F 3/1222* (2013.01); *G06F 3/1238* (2013.01); *H04N 1/4486* (2013.01)

(58) Field of Classification Search
CPC .............. H04N 1/32272; H04N 1/4486; G06F 3/1238; G06F 3/1222
USPC ......................................................... 358/1.15
See application file for complete search history.

(56) References Cited

U.S. PATENT DOCUMENTS

| 2004/0123113 | A1* | 6/2004 | Mathiassen | B60R 25/252 713/185 |
| 2014/0136853 | A1* | 5/2014 | Fukuda | H04L 63/0428 713/189 |
| 2018/0173465 | A1* | 6/2018 | Tanaka | G06F 3/0412 |

FOREIGN PATENT DOCUMENTS

JP   2008269246 A   11/2008

* cited by examiner

*Primary Examiner* — Tammy Paige Goddard
*Assistant Examiner* — Darryl V Dottin
(74) *Attorney, Agent, or Firm* — Buchanan Ingersoll & Rooney PC

(57) ABSTRACT

An information processing apparatus includes: a non-volatile memory; and a hardware processor that controls the non-volatile memory, wherein the hardware processor determines whether communication speed of a communication path to the non-volatile memory is equal to or less than a threshold value and encrypts the data transmitted to the non-volatile memory when the communication speed is determined to be equal to or less than the threshold value.

12 Claims, 3 Drawing Sheets

INFORMATION PROCESSING APPARATUS AND DATA STORAGE PROGRAM

The entire disclosure of Japanese patent Application No. 2018-119554, filed on Jun. 25, 2018, is incorporated herein by reference in its entirety.

BACKGROUND

Technological Field

The present invention relates to an information processing apparatus and a data storage program, and more particular to an information processing apparatus that processes data using a non-volatile memory, and a data storage program that is executed by a computer that controls the information processing apparatus.

Description of the Related art

An information processing apparatus typified by a multifunction peripheral (MFP) includes a non-volatile memory and may store data, which is to be processed by the information processing apparatus, in the non-volatile memory. In this case, in order to protect data stored in the non-volatile memory, the data stored in the non-volatile memory may be encrypted. For example, JP 2008-269246 A describes an image formation apparatus with a non-volatile memory that stores print data received from a higher-level device or print data produced in the apparatus, the image formation apparatus including an encryptor that encrypts the print data and a decoder that decodes the print data encrypted by the encryptor, in which the non-volatile memory stores the print data encrypted by the encryptor, and the decoder decodes the encrypted print data read from the non-volatile memory.

In addition, in recent years, a non-volatile memory with an encryption function has become available. Therefore, because it is not necessary to encrypt data in a central processing unit (CPU) that stores data in the non-volatile memory, loads on the CPU can be reduced.

Meanwhile, when a non-volatile memory with an encryption function is used, the data before stored in the non-volatile memory is not encrypted. Therefore, when a transmission path between the CPU and the non-volatile memory is changed, e.g., such that the transmission path is branched improperly, there is a problem that the data is leaked to the outside while the data is transmitted to the non-volatile memory from the CPU and the data cannot be protected. In particular, when there is an abnormality, e.g., branching of the transmission path, communication at an intended communication speed is difficult, resulting in a case where the communication speed can be slower than a predetermined speed. In such a case, reading of data due to the branching becomes easy, and the data can be leaked to the outside.

SUMMARY

The present invention has been made in order to solve the aforementioned problem, and it is an object of the present invention to provide an information processing apparatus with enhanced data security.

Another object of the present invention is to provide a data storage program with enhanced data security.

To achieve at least one of the abovementioned objects, according to an aspect of the present invention, an information processing apparatus reflecting one aspect of the present invention comprises: a non-volatile memory, and a hardware processor that controls the non-volatile memory, wherein the hardware processor determines whether communication speed of a communication path to the non-volatile memory is equal to or less than a threshold value and encrypts the data transmitted to the non-volatile memory when the communication speed is determined to be equal to or less than the threshold value.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
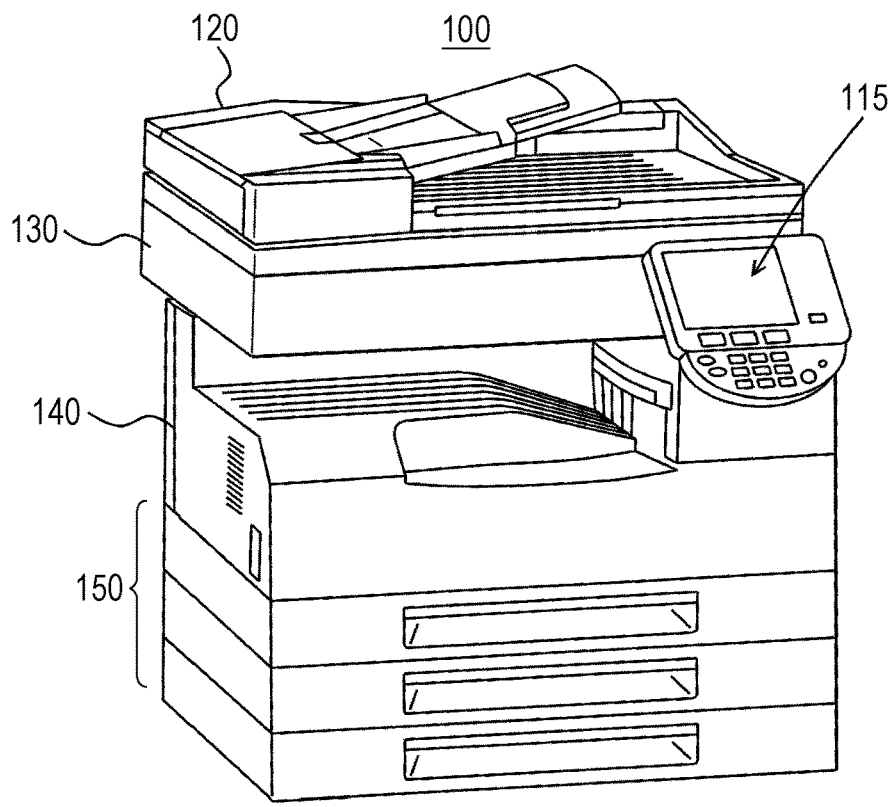
FIG. 1 is a perspective view illustrating an external appearance of an MFP according to one embodiment.

Hereinafter, one or more embodiments of the present invention will be described with reference to the drawings. However, the scope of the invention is not limited to the disclosed embodiments. In the description below, like parts are designated with like reference numerals. Also, their names and functions are the same. Therefore, they are not elaborated.

FIG. 1 is a perspective view illustrating an external appearance of an MFP according to one embodiment. Referring to FIG. 1, an MFP 100 is an example of an information processing apparatus and includes a manuscript reader 130 for reading a manuscript, an automatic manuscript conveyer 120 for conveying a manuscript to the manuscript reader 130, an image former 140 for forming an image on a paper sheet or the like on the basis of image data that is output as the manuscript reader 130 reads the manuscript, a paper feeder 150 for feeding a paper sheet to the image former 140, and an operation panel 115, which serves as a user interface.

The automatic manuscript conveyer 120 automatically conveys a plurality of manuscripts set on a manuscript feed tray to a predetermined manuscript read position set on a platen glass of the manuscript reader 130 one by one, and discharges the manuscript a manuscript the manuscript image of which has been read by the manuscript reader 130 to a manuscript discharge tray. The manuscript reader 130 includes a light source for emitting light to the manuscript conveyed to the manuscript read position and a photoelectric conversion element that receives light reflected off the manuscript, and scans the manuscript image corresponding to the size of the manuscript. The photoelectric conversion element converts the received light to image data, which is an electric signal, and outputs the image data to the image former 140. The paper feeder 150 conveys the paper sheet stored on the feed tray to the image former 140.

The image former 140 is to form an image by a well-known electrophotographic method. The image former 140 forms an image on a paper sheet conveyed by the paper feeder 150 on the basis of image data after data processing onto which various data processing has been performed including shading correction on the image data input from the manuscript reader 130, or image data received from the outside.

The operation panel 115 is provided on an upper surface of the MFP 100, displays an operation screen or the like, and functions as a user interface that accepts a user's operation.

Figure 2:
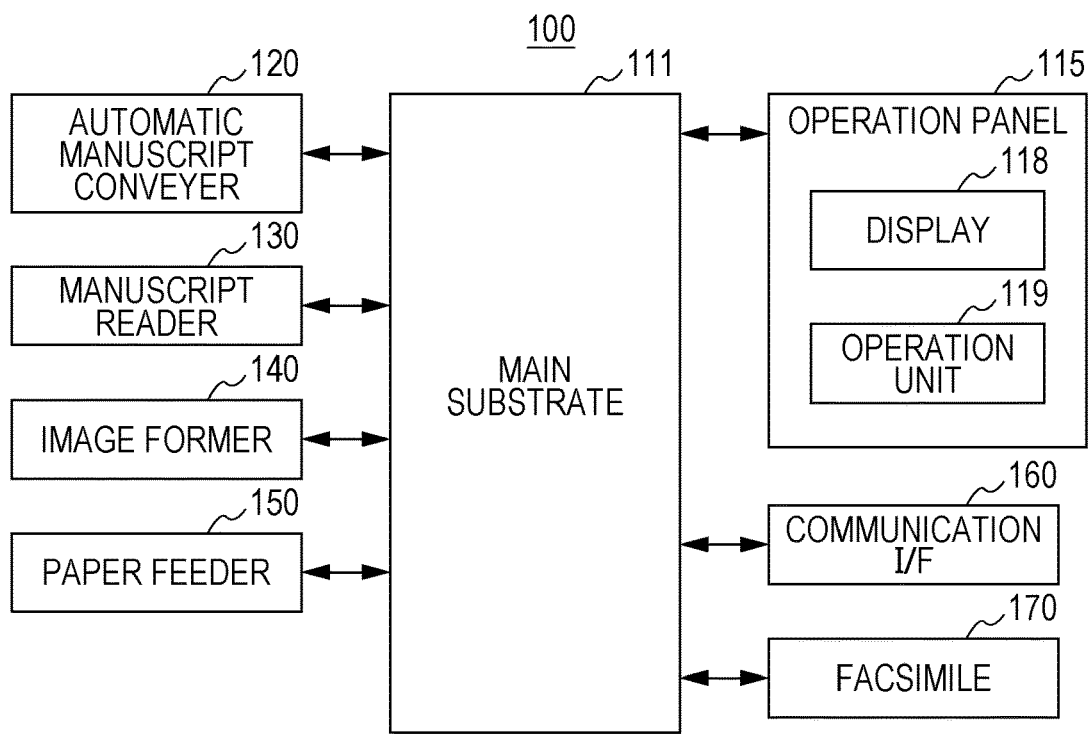
FIG. 2 is a block diagram illustrating an example of an overview of a hardware configuration of an MFP.

FIG. 2 is a block diagram illustrating an example of an overview of a hardware configuration of an MFP. Referring to FIG. 2, the MFP 100 includes a main substrate 111, the operation panel 115, a communication interface (I/F) 160, a facsimile 170, in addition to the automatic manuscript conveyer 120, the manuscript reader 130, the image former 140, the paper feeder 150, which are described above, and they are connected by a bus specified according to PCI (peripheral component interconnect)-Express standards (hereinafter the "PCI-E bus").

The main substrate 111 includes a CPU (central processing unit) 21 (see FIG. 3) that generally controls the MFP 100. The CPU 21 is set as a root complex in the PCI-E bus 29 (see FIG. 3), and the automatic manuscript conveyer 120, the manuscript reader 130, the image former 140, the paper feeder 150, the communication I/F 160, the facsimile 170, and the operation panel 115 are set as endpoints.

The communication I/F 160 is an interface for connecting the MFP 100 to a network. The communication I/F 160 is a communication protocol, e.g., a TCP (transmission control protocol) or an FTP (file transfer protocol), and communicates with another computer that is connected to the network. Note that a protocol for communication is not particularly limited, and any protocol may be used. In addition, a network to which the communication I/F 160 is connected is, for example, a local area network (LAN), and connection may be provided by wire or wirelessly. In addition, the network is not limited to the LAN, but a wide area network (WAN), a network using public switched telephone networks, or the like may be adopted. Furthermore, the network is connected to the Internet. Therefore the MFP 100 can communicate with a computer, e.g., a server, connected to the Internet.

The facsimile 170 is connected to the public switched telephone networks (PSTN), and transmits and receives facsimile data.

The operation panel 115 includes a display 118 and an operation unit 119. The display 118 is, for example, a liquid crystal display (LCD), and displays a menu for instructions to a user, or information related to acquired image data, or the like. The operation unit 119 includes a plurality of hardware keys and a touch panel. The touch panel is a multi touch-compatible touch panel superimposed on the display 118 on an upper surface or a lower surface of the display 118. The touch panel detects a position specified by the user within the display surface of the display 118.

Figure 3:
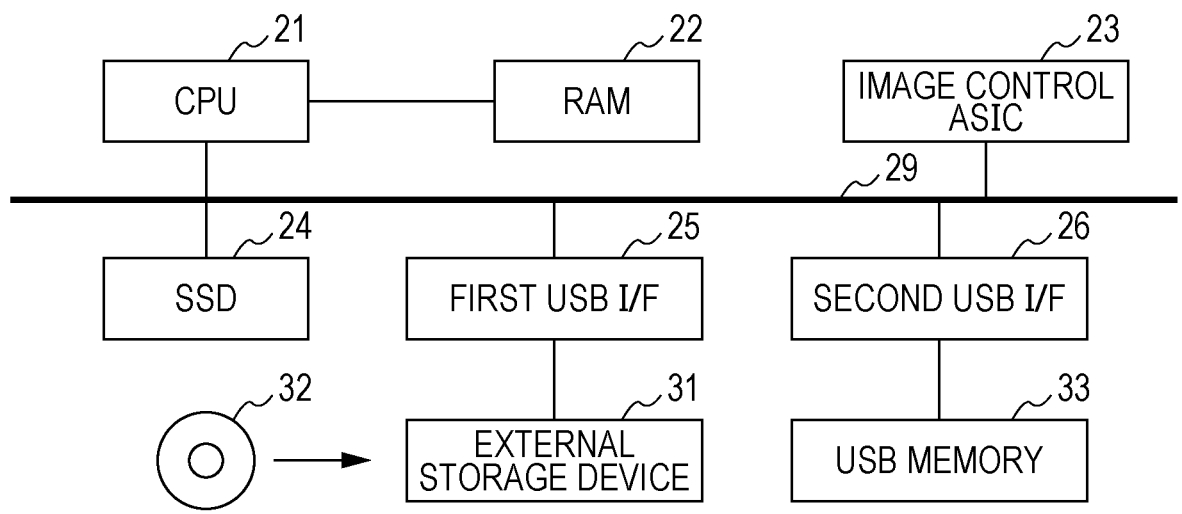
FIG. 3 is a block diagram illustrating an example of a detailed configuration of a main substrate.

FIG. 3 is a block diagram illustrating an example of a detailed configuration of a main substrate. Referring to FIG. 3, a main substrate 111 includes the CPU 21, a RAM (random access memory) 22, an image control ASIC (application specific integrated circuit) 23, an SSD (solid state drive) 24, which is a non-volatile memory, a first USB I/F (universal serial bus interface) 25, and a second USB I/F 26.

The CPU 21 is connected to the RAM 22 by DDR (double-data-rate). The CPU 21 is connected to the image control ASIC 23, the SSD 24, the first USB I/F 25, and the second USB I/F 26 by the PCI-E bus 29, and can transfer data. The CPU 21 is set as a root complex at the PCI-E bus 29, and the image control ASIC 23, the SSD 24, the first USB I/F 25 and the second USB I/F 26 are set as endpoints.

The RAM 22 is a volatile semiconductor memory used as a working region of the CPU 21. The SSD 24 includes a control region and an application region. In addition, when the SSD 24 functions as a virtual memory of the RAM 22, the SSD 24 includes a virtual memory region. The control region is a region that stores a program for the CPU 21 to control the MFP 100 and control data used for executing the program. The control data is control information for operating the MFP 100. The application region is a region that stores data other than the control data. The data other than the control data is application information. The application information includes, for example, print data received by the communication I/F 160, image data obtained by being read by the manuscript reader 130, and facsimile data transmitted and received by the facsimile 170.

In addition, the SSD 24 encrypts and stores the data. Therefore, because the data stored in the SSD 24 is encrypted, the data can be protected even if the SSD 24 is stolen.

The CPU 21 loads the program, which is stored in the control region of the SSD 24, onto the RAM 22 and executes the program. The program executed by the CPU 21 includes a control program for controlling hardware resources and an application program. The hardware resources include the automatic manuscript conveyer 120, the manuscript reader 130, the image former 140, the paper feeder 150, the communication I/F 160, the facsimile 170, the SSD 24, and the operation panel 115. The application program includes, for example, a facsimile transmission program for controlling the facsimile 170 to transmit facsimile data, a facsimile reception program for controlling the facsimile 170 to receive facsimile data, a print program for controlling the communication I/F 160 to receive print job and control the image former 140 and the paper feeder 150 to form an image on the basis of the print job, and a manuscript read program for controlling the manuscript reader 130 to read the manuscript. In addition, the application program may include a maintenance program for managing an expendable the MFP 100 has, and an error state notification program that gives a notice of an error state. Note that the application program executed by the CPU 21 is not limited the above.

The image control ASIC 23 is an image processing circuit controlled by the CPU 21. The image control ASIC 23 is connected to and controls the automatic manuscript conveyer 120, the manuscript reader 130, the image former 140, and the paper feeder 150. In addition, the image control ASIC 23 includes a function of executing predetermined image processing on the image data output as the manuscript reader 130 reads the manuscript, a function of converting the image data to raster data for printing by the image former 140, and a function of encrypting the image data. The image control ASIC 23 can store the image data, which is to be processed, in the SSD 24. The image control ASIC 23, when receiving an encryption instruction from the CPU 21, encrypts the image data and transmits the image data to the SSD 24 in order to store the image data in the SSD 24.

The first USB I/F 25 and the second USB I/F 26 are a serial communication interface. The first USB I/F 25 and the second USB I/F 26 are connected to a device that can be communicated by USB standards The CPU 21 can communicate with a device connected to the first USB I/F 25 and the second USB I/F 26. Here, an example is indicated in which the external storage device 31 on which a CD-ROM (compact disk ROM) 32 is mounted is connected to the first USB I/F 25, and an USB memory 33 with a non-volatile memory is connected to the second USB I/F 26. In this case, the CPU 21 can control the external storage device 31 via the first USB I/F 25 to read the data stored in the CD-ROM 32 mounted on the external storage device 31. In addition, the CPU 21 can control the USB memory 33 via the second USB I/F 26 to cause the USB memory 33 to store the data or read the data stored in the USB memory 33. In this case, when the USB memory 33 has an encryption function, the USB memory 33 encrypts and stores the data for which a write instruction is given from the CPU 21.

The CPU 21 can load the program recorded on the CD-ROM 32 mounted on the external storage device 31 or the program stored in the USB memory 33 onto the RAM 22 and execute the program. Note that a medium for storing the program executed by the CPU 21 is not limited to the CD-ROM 32 or the USB memory 33, but may be an optical disc (MO (magnetic optical disc)/MD (mini disc)/DVD (digital versatile disc)), an IC card, an optical card, or the like.

In addition, for the program executed by the CPU 21, another computer connected to a network may rewrite the program stored in the SSD 24 or adds and writes a new program via the network connected to the communication I/F 160. Furthermore, the CPU 21 may download a program from another computer connected to the network and store the program in the SSD 24. The program herein includes not only a program that is directly executable by the CPU 21, but also a source program, a compressed program, an encrypted program.

Figure 4:
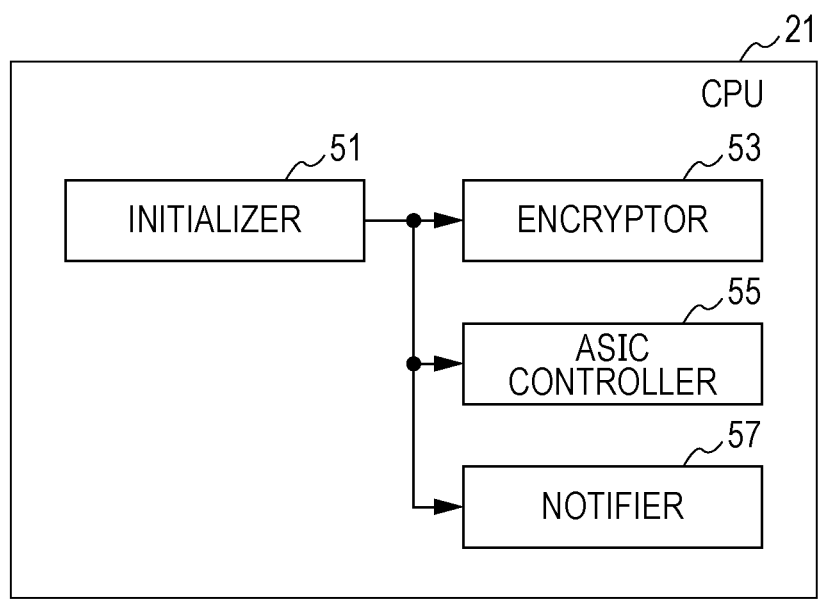
FIG. 4 is a block diagram illustrating an example of a function of a CPU in an MFP of the present embodiment.

FIG. 4 is a block diagram illustrating an example of a function of a CPU in an MFP of the present embodiment. The function illustrated in FIG. 4 is a function that is achieved by the CPU 21 when the CPU 21 of the MFP 100 executes a data storage program stored in the SSD 24, the CD-ROM 32, or the USB memory 33. Referring to FIG. 4, the CPU 21 includes an initializer 51, an encryptor 53, an ASIC controller 55, and a notifier 57.

The initializer 51 initializes a PCI-Express endpoint device. The initializer 51 decides on an endpoint and communication speed S at a time of initializing the endpoint. The initializer 51, when the endpoint is a non-volatile memory, when the communication speed S decided with respect to the endpoint is equal to or less than a preset threshold value TH, sets an encryption mode to ON with respect to the endpoint, and when the communication speed S is greater than the preset threshold value TH, sets the encryption mode to OFF with respect to the endpoint. The initializer 51 outputs the encryption mode decided with respect to the endpoint to the encryptor 53, the ASIC controller 55, and the notifier 57.

Specifically, the initializer 51 decides on the communication speed S of the SSD 24 and sets the encryption mode at a time when the power of the MFP 100 is ON. In addition, the initializer 51 decides on the communication speed S of the USB memory 33 and sets the encryption mode when the USB memory 33 is connected to the second USB I/F 26 at a time when the power of the MFP 100 is ON. Furthermore, even if the USB memory 33 is not connected to the second USB I/F 26 at a time when the power of the MFP 100 is ON, at a time when the USB memory 33 is connected to the second USB I/F 26 subsequently, the initializer 51 decides on the communication speed S of the USB memory 33 and sets the encryption mode.

A plurality of versions with different communication speeds is specified by PCI-Express standard The initializer 51 decides on any of the plurality of versions at a time of initializing the endpoint. Therefore, the initializer 51 may set the encryption mode to ON when a version in which the communication speed is lower than that of a preset version is decided. The preset version is a version in which the communication speed is higher than the threshold value TH, which is the preset communication speed. Furthermore, the initializer 51 may measure the actual communication speed S by transmitting and receiving test data to and from the endpoint device and set the encryption mode when the measured communication speed S is equal to or less than the threshold value TH even when the decided version is higher in communication speed than the preset version.

The encryptor 53 encrypts data to be stored in the application region among data stored in the SSD 24 when the encryption mode corresponding to the SSD 24 is set to ON. The encryptor 53, when the SSD 24 functions as a virtual memory of the RAM 22, when the encryption mode corresponding to the SSD 24 is set to ON, encrypts data stored in the application region and the virtual memory region among data stored in the SSD 24. Note that the encryptor 53 may encrypt all data stored in the SSD 24 when the encryption mode corresponding to the SSD 24 is set to ON. The encryptor 53 does not encrypt the data stored in the SSD 24 when the encryption mode corresponding to the SSD 24 is set to OFF.

The encryptor 53 encrypts data to be stored in the USB memory 33 when the encryption mode corresponding to the USB memory 33 is set to ON. The encryptor 53 does not encrypt data stored in the USB memory 33 when the encryption mode corresponding to the USB memory 33 is set to OFF.

The image control ASIC 23 controls the image control ASIC 23 and gives an instruction of encrypting data stored in the SSD 24 when the encryption mode corresponding to the SSD 24 is set to ON. Specifically, when an instruction of executing processing is given to the image control ASIC 23, the image control ASIC 23 is set to encrypt data stored in the SSD 24. Note that at a stage of initializing the image control ASIC 23, the image control ASIC 23 may be set to encrypt data stored in the SSD 24.

The notifier 57 notifies the user of a failure of write of data into the SSD 24 when the encryption mode corresponding to the SSD 24 is set to ON. The case in which the encryption mode corresponding to the SSD 24 is set to ON is a case where the communication speed S of the SSD 24 is equal to or less than the threshold value TH. In this case, there is a possibility of occurrence of a failure in a communication path between the CPU 21 and the SSD 24. Because communication is enabled between the CPU 21 and the SSD 24, there is a possibility of leakage to the outside of the MFP 100 during transmission of the data from the CPU 21 to the SSD 24. Therefore, the notifier 57 urges the user to check the communication path between the CPU 21 and the SSD 24. For example, a notice is given such that an electronic mail is transmitted to a user who is preset as a manager of the MFP 100 or a message is displayed on the display 118. Note that the notification method is not limited to transmission of an electronic mail or display of a message, but a notice may be given by voice and light may be emitted.

Figure 5:
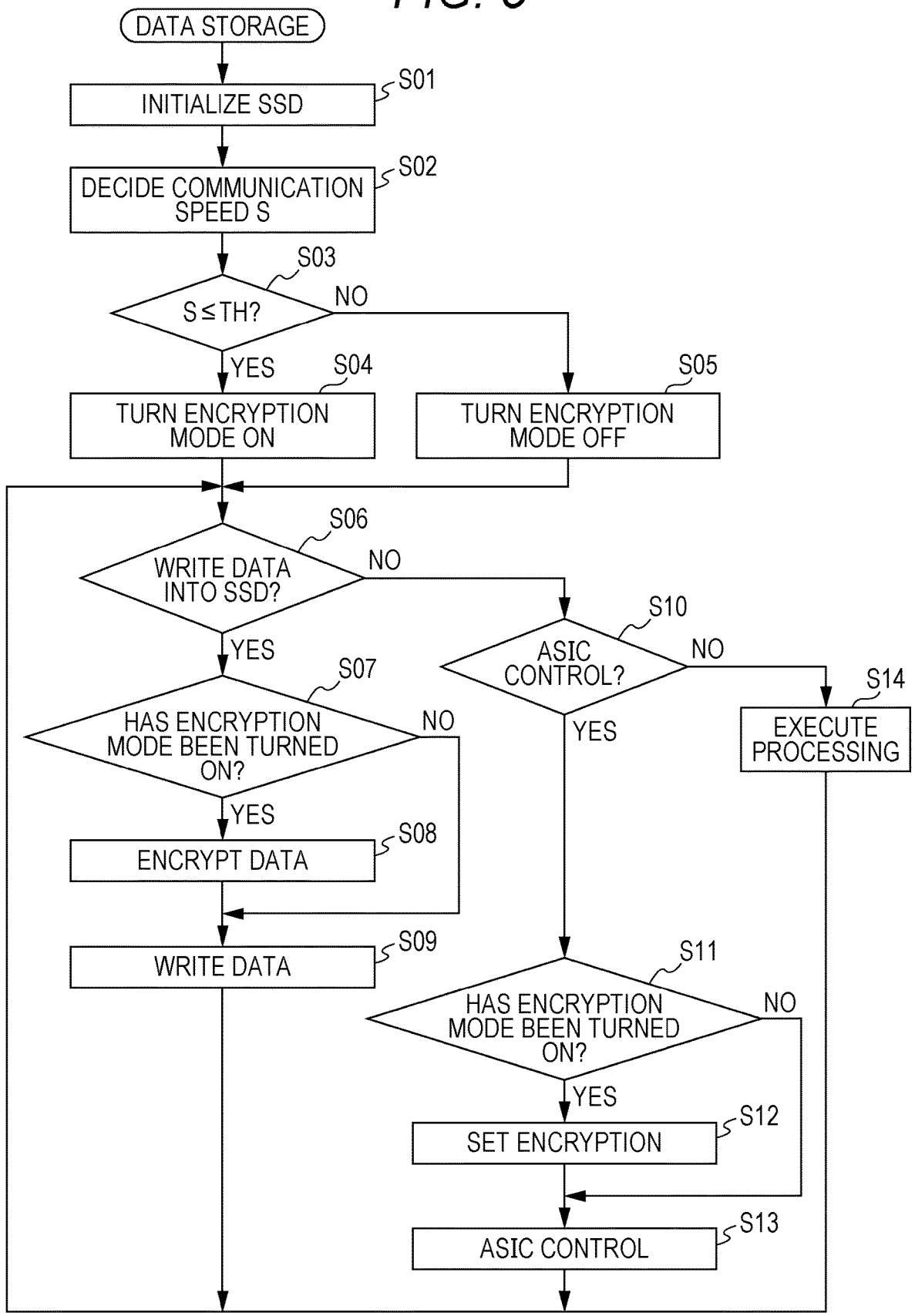
FIG. 5 is a flowchart illustrating an example of flow of data storage processing.

FIG. 5 is a flowchart illustrating an example of flow of data storage processing. The data storage processing is processing that is executed by the CPU 21 when the CPU 21 of the MFP 100 executes a data storage program stored in the SSD 24, the CD-ROM 32, or the USB memory 33. Referring to FIG. 5, the CPU 21 of the MFP 100 executes initialization processing on the SSD 24 (step S01). The SSD 24 is initialized according to PCI-Express standard Then, the communication speed S for communication with respect to the SSD 24 is decided (step S02).

In next step S03, it is determined whether the communication speed S is equal to or less than the preset threshold value TH. When the communication speed S is equal or less than the threshold value TH, the processing proceeds to step S04, and if not the processing proceeds to step 505. In step S04, the encryption mode with respect to the SSD 24 is set to ON, and in step S05 in which the processing proceeds to step S06, the encryption mode with respect to the SSD 24 is set to OFF, and the processing proceeds to step S06.

In step S06, it is determined whether processing of writing data into the SSD 24 has occurred. When the write processing has occurred, the processing proceeds to step S07, and if not the processing proceeds to step S10. In step S07, it is determined whether the encryption mode with respect to the SSD 24 is set to ON. When the encryption mode is set to ON, the processing proceeds to step S08, and if not the step S08 is skipped, and the processing proceeds to step S09. In step S08, the data to be written into the SSD 24 is encrypted, and the processing proceeds to step S09. In step S09, the data is written into the SSD 24, and the processing returns to step S06. When step S08 is executed, the data obtained by encrypting the data to be written into the SSD 24 is transmitted to the SSD 24 and stored in the SSD 24. When the SSD 24 has an encryption function, the data encrypted by the CPU 21 is further encrypted and stored in the SSD 24. When step S08 is not executed, the data to be written into the SSD 24 is not encrypted, but transmitted to the SSD 24 and stored in the SSD 24. When the SSD 24 has an encryption function, the SSD 24 encrypts the data transmitted from the CPU 21 and stores the data.

In step S10, it is determined whether processing of causing the ASIC to execute image processing has occurred. When the processing of causing the ASIC to execute image processing has occurred, the processing proceeds to step S11, and if not the processing proceeds to step S14. In step S14, the processing that has occurred is executed and the processing returns to step S06.

In step S11, it is determined whether the encryption mode with respect to the SSD 24 has been set to ON. When the encryption mode is set to ON, the processing proceeds to step S12, and if not the step S12 is skipped, and the processing proceeds to step S13. In step S12, the image control ASIC 23 is set to encrypt the data stored in the SSD 24, and the processing proceeds to step S13. In step S13, the image control ASIC 23 is caused to execute the processing and the processing returns to step S06. Thus, when the image control ASIC 23 is set to perform encryption in step S12, the image control ASIC 23 encrypts the data to be written into the SSD 24 and writes the data into the SSD 24. When step S12 is executed, the data obtained by encrypting the data to be written into the SSD 24 by the image control ASIC 23 is transmitted to the SSD 24 and stored in the SSD 24. When the SSD 24 has an encryption function, the data encrypted by the image control ASIC 23 is further encrypted and stored in the SSD 24. When step S12 is not executed, the image control ASIC 23 does not encrypt the data to be written into the SSD 24 and writes the data into the SSD 24. When the SSD 24 has an encryption function, the SSD 24 encrypts the data transmitted from the image control ASIC 23 and stores the data.

As described above, the MFP 100 of the present embodiment functions as an information processing apparatus, includes the SSD 24, which is a non-volatile memory, and the CPU 21 that controls the SSD 24. The CPU 21, when the communication speed S with respect to the SSD 24 is decided to be equal to or less than the threshold value TH, encrypts the data transmitted to the SSD 24. When the communication speed S with respect to the SSD 24 is equal to or less than the threshold value TH, there is a possibility of occurrence of an abnormality in the transmission path between the CPU 21 and the SSD 24. For example, when another transmission path is connected improperly, the data transmitted to the SSD 24 is also delivered to another transmission path. Therefore, the data can be transmitted to a device different from the SSD 24. According to the present embodiment, even when such an abnormality occurs in the transmission path to the SSD, the data being transmitted to the SSD 24 can be protected.

In addition, because the SSD 24 encrypts and stores the data, the data before stored in the SSD 24 can be protected. Because the data before stored in the SSD 24 is encrypted, the data transmitted from the CPU 21 to the SSD 24 can be protected.

Furthermore, the CPU 21, when the communication speed S with respect to the SSD 24 is decided to be equal to or less than the threshold value TH, causes the image control ASIC 23 to encrypt the data transmitted to the SSD 24 by the image control ASIC 23. Therefore, the data processed by the image control ASIC 23 can be protected.

In addition, because the SSD 24 includes the control region that stores the control information for operating the MFP 100 and the application region that stores the application information other than the control information, the control information included in the control region and the application information stored in the application region can be protected.

In addition, the CPU 21 may encrypt the data stored in the application region of the SSD 24. In this case, the application information stored in the application region can be protected. In addition, the control information stored in the control region may not be encrypted. In this case, loads on the CPU 21 can be reduced.

In addition, when the SSD 24 includes the virtual memory region used as a virtual memory of the RAM 22 by the CPU 21, the CPU 21 may encrypt the data stored in the virtual memory region. In this case, because the data stored in the virtual memory region is encrypted, the data to be processed by the CPU 21 can be protected.

In addition, the CPU 21, when the communication speed S with respect to the SSD 24 is decided to be equal to or less than the threshold value TH, can give a notice to the user, and therefore the user can be noticed of the risk of leakage of the data.

In addition, the CPU 21 measures time of write and/or read of test data in order to determine the communication speed S with respect to the SSD 24. Therefore, an alteration of the transmission path between the SSD 24 and the CPU 21 can be detected.

In addition, the CPU 21, at a stage of initializing the SSD 24, decides on the communication speed S. Therefore, it is possible to decide whether to encrypt the data before storage into the SSD 24.

Note that, in the aforementioned embodiment, description is given of the MFP 100 as an example of the information processing apparatus. However, needless to say, the invention can be understood to be a data storage method in which the MFP 100 executes the data storage processing illustrated in FIG. 5 and a data storage program that causes the CPU 21 of the MFP 100 to execute the data storage method.

Although embodiments of the present invention have been described and illustrated in detail, the disclosed embodiments are made for purposes of illustration and example only and not limitation The scope of the present invention should be interpreted by terms of the appended claims, and it is intended that meanings equivalent to the scope of the claims and all changes within the scope are included.

What is claimed is:

1. An information processing apparatus comprising:
a non-volatile memory; and
a hardware processor that controls the non-volatile memory,
wherein
the hardware processor is configured to:
measure a communication speed of a communication path to the non-volatile memory;
determine whether the measured communication speed is equal to or less than a threshold value, and
encrypt data transmitted to the non-volatile memory only when the communication speed is determined to be equal to or less than the threshold value.

2. The information processing apparatus according to claim 1, wherein the non-volatile memory is a non-volatile memory with an encryption function.

3. The information processing apparatus according to claim 1, further comprising an image processing circuit that processes image data, wherein the hardware processor controls, when the communication speed to the non-volatile memory is determined to be equal to or less than the threshold value, the image processing circuit to encrypt the data transmitted to the non-volatile memory.

4. The information processing apparatus according to claim 1, wherein the non-volatile memory includes a control region that stores control information for operating the information processing apparatus and an application region that stores application information other than the control information.

5. The information processing apparatus according to claim 4, wherein the hardware processor encrypts the data stored in the application region.

6. The information processing apparatus according to claim 5, wherein the hardware processor does not encrypt the data stored in the control region.

7. The information processing apparatus according to claim 1, further comprising a volatile memory used as a working region by the hardware processor, wherein the non-volatile memory includes a virtual memory region that is used by the hardware processor as a virtual memory of the volatile memory, and the hardware processor encrypts the data stored in the virtual memory region.

8. The information processing apparatus according to claim 1, wherein the hardware processor further gives a notice to a user when the communication speed to the non-volatile memory is determined to be equal to or less than the threshold value.

9. The information processing apparatus according to claim 1, wherein the hardware processor measures time for writing and/or reading test data in order to determine the communication speed to the non-volatile memory.

10. The information processing apparatus according to claim 1, wherein the hardware processor decides on the communication speed to the non-volatile memory, and determines whether the decided communication speed is equal to or less than the threshold value.

11. The information processing apparatus according to claim 1, wherein the hardware processor decides on the communication speed to the non-volatile memory at a stage of initializing the non-volatile memory.

12. A non-transitory recording medium storing a computer readable data storage program that is executed by a computer that controls an information processing apparatus with a non-volatile memory, the data storage program causes the computer to execute:

measuring a communication speed to the non-volatile memory; and encrypting data transmitted to the non-volatile memory only when the measured communication speed is equal to or less than a threshold value.

* * * * *